United States Patent [19]

Chan

[11] 4,355,357

[45] Oct. 19, 1982

[54] DIPMETER DATA PROCESSING TECHNIQUE

[75] Inventor: David S. K. Chan, Bethel, Conn.

[73] Assignee: Schlumberger Technology Corporation, New York, N.Y.

[21] Appl. No.: 135,957

[22] Filed: Mar. 31, 1980

[51] Int. Cl.³ .......................................... G06F 15/336
[52] U.S. Cl. .................................... 364/422; 324/323; 340/860; 367/33
[58] Field of Search ................ 364/422, 819; 324/323, 324/339, 366; 340/860; 367/33

[56] References Cited

U.S. PATENT DOCUMENTS

| 3,068,400 | 12/1962 | Castel et al. | 324/323 |
| 3,127,509 | 3/1964 | Swift | 324/323 X |
| 3,402,388 | 9/1968 | Tucker | 367/33 |
| 3,975,674 | 8/1976 | McEuen | 324/323 X |

OTHER PUBLICATIONS

P. Vincent, et al., "An Approach to Detailed Dip Determination Using Correlation by Pattern Recognition," *Journal of Petroleum Technology*, 2-1979, pp. 232–240.

V. Hepp, et al.,"Cluster—A Method for Selecting the Most Probable Dip Results from Dipmeter Surveys," Society of Petroleum Engineers of AIME, 1975, #SPE-5543.

T. G. Stockham, Jr., "High-Speed Convolution and Correlation," *AFIPS Conf. Proc.*, vol. 28, pp. 229–233, 1966.

*Primary Examiner*—Jerry Smith
*Attorney, Agent, or Firm*—Henry N. Garrana

[57] ABSTRACT

Methods and apparatus, for processing signals derived along portions of the length of a borehole to determine the relative position of geological formation characteristics, effect the correlation of pairs of signals using substantially overlapping correlation intervals to obtain cross-correlation functions for each pair of signals. These cross-correlation functions are then displayed as a function of borehole depth for each pair of curves such that discontinuities in the cross-correlation functions are rendered obvious. From such discontinuities, zoning of the data is enabled through determination of the position of significant continuous intervals. Sequences of cross-correlation functions which belong to one of these intervals may then be used to directly determine the corresponding relative position of a formation characteristic. When applied to dipmeter signals, the method produces more accurate and geologically consistent dip and azimuth values for subsurface formations.

39 Claims, 8 Drawing Figures

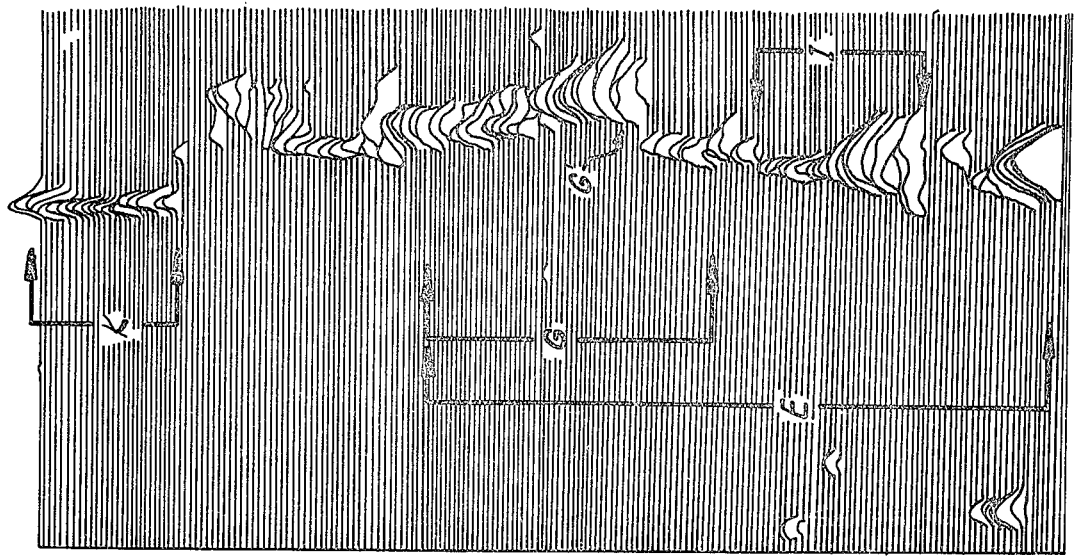
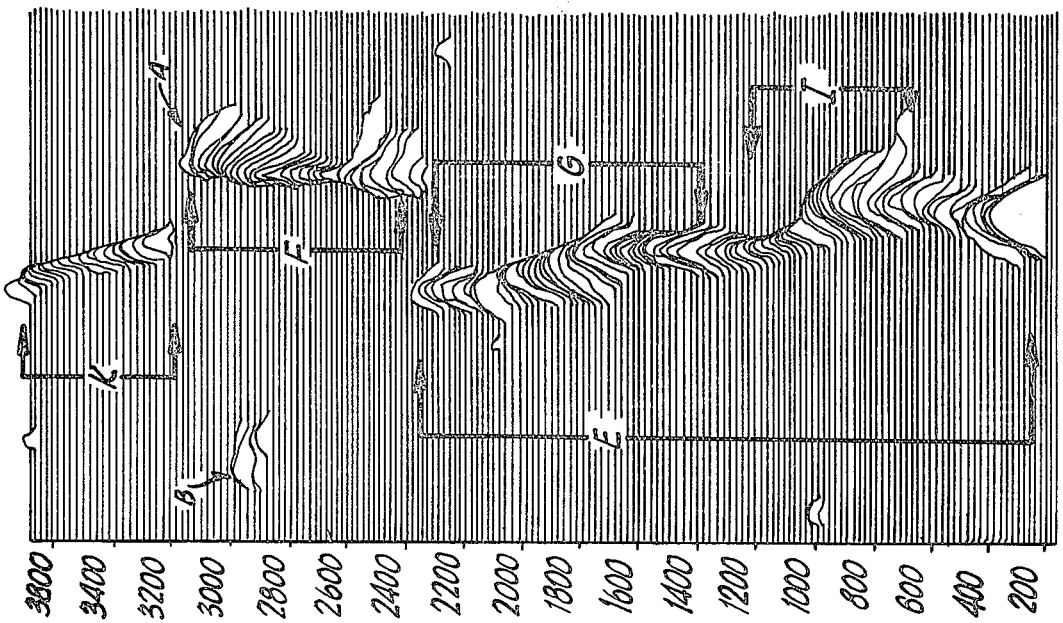

DIPMETER DATA PROCESSING TECHNIQUE

BACKGROUND OF THE INVENTION

This invention relates generally to techniques used in geophysical well logging, and more particularly to new techniques for automatically processing dipmeter signals to produce more accurate dip and azimuth representations of subsurface formations.

A common method of measuring the dip angle and direction or azimuth of subsurface formations employs a dipmeter tool passed through a borehole drilled into the subsurface formations. This tool may apply any of numerous means to obtain geophysical signals representative of variations of a particular formation characteristic, such as resistivity. One such tool is described in the paper: "The High Resolution Dipmeter Tool", by L. A. Allaud and J. Ringot, published in the May-June 1969 issue of The Log Analyst.

Dip and azimuth measurements representing the inclination of a formation characteristic or feature may be determined from dipmeter signals containing information representing the intersection of such a feature at three or more radially spaced points on the borehole surface. A two-step decision process is traditionally employed whereby in a first step the displacement between two points intersecting a common feature may be determined, under favorable circumstances, by correlating pairs of dipmeter signals, each having a similar response to the common feature. Thereafter, in a second step the displacements between at least three different points are examined to determine the position of a plane. The position of such a plane is conveniently expressed by its dip, an angle measured from a reference (usually horizontal) plane, and its azimuth, an angle measured from a reference direction (usually true North). Typically, the dipmeter signals are recorded as a function of depth on computer compatible magnetic tape at the well site for later processing. The measured signals can be processed either at the well site or off the well site using any of several techniques such as manual, semi-automatic and fully automatic processing which may be aided by either analog or digital computers.

A computer program to perform the digital processing operations is described in a paper entitled "Automatic Computation of Dipmeter Logs Digitally Recorded on Magnetic Tape" by J. H. Moran, et al, and published in the July, 1962 issue of the Journal of Petroleum Technology. An additional computer program is described in the paper, "Computer Methods of Dip Log Correlation" by L. G. Schoonover et al, pages 31-38, published in the February 1973 issue of Society of Petroleum Engineers Journal. Furthermore, programs to process digitally-taped dipmeter data are available from digital computer manufacturers, such as IBM.

Results from the processing of the measured signals are normally presented in tabular listings as dip and azimuth measurements versus borehole depth. When desired, the individual displacements found between the correlation curve pairs which led to the dip and azimuth values may also be presented.

At each step or depth level, one sequence of displacements between various pairs of signal combinations may be obtained. A typical sequence includes at least two displacements but may include a round of up to six displacements in each sequence when four separate signals are employed. When a round or more than two displacements in one sequence is obtained, the displacements may be combined into many more possibly different combinations, each combination corresponding to perhaps a different dip and azimuth measurement. Since only two related displacements are required, it is presently a common practice to utilize only what appears to be the two best qualified displacements. All other displacements are discarded without further consideration, thereby producing only one result per sequence of displacements. Further, little information is retained regarding the position of the sources or of the measured signals of the dipmeter pads corresponding to the utilized displacements other than perhaps a display of a caliper measurement.

When large numbers of measurements result, as from recent high resolution dipmeter techniques, tabular listings are usually augmented by graphic presentations of dip and azimuth representations. The graphic displays vary with the interpretation objective, depending upon whether the purpose is for stratigraphic or structural studies. Accordingly, relationships between the corresponding dip and azimuth measurements and their continuity with depth are considered in different manners.

For stratigraphic analysis purposes, trends of adjacent dip measurements, for example, measurements representing a trend of rapidly increasing dip with depth, are considered separately from measurements representing a trend of rapidly decreasing dip with depth. It is important that the azimuth of these dips remain substantially constant and thereby represent the general direction of sediment transport or perhaps the probable direction of down dip thickening. Dipmeter results may be further combined in a given analysis from intervals corresponding to a given depositional or stratigraphic unit.

Graphic displays used in stratigraphic analysis are typically the azimuth frequency plot (no dip or depth representation) and the Schmidt net and the Stereonet (azimuth versus dip but still no depth representation). These nets and several variations thereof have known statistical characteristics in that they may enhance either low or high dip measurement point groupings. In their use, the dip and azimuth value for each measurement is combined and represented by a point in these nets. A description of some of these displays and their application is given in a paper entitled "Stratigraphic Applications of Dipmeter Data in Mid-Continent" by R. L. Campbell, Jr., published September 1968 in the American Association of Petroleum Geologists Bulletin.

Structural analysis is distinguished from stratigraphic analysis in the type of information needed. While in stratigraphic analysis, the measured signals hopefully represent bedding planes within the boundaries of a given geological unit, these bedding planes have little, if any, regional extent. Structural analysis, in contrast, requires a deliberate attempt to mask out such sedimentary features in favor of enhancing the boundaries of the individual strata.

Conventionally, short lengths (1 to 2 feet) of dipmeter signals along a borehole are correlated to obtain stratigraphic information while long lengths (10 to 20 feet) are correlated to obtain structural information. While use of long correlation lengths to obtain structural dip has been standard practice for some time, there are certain disadvantages associated with the use of long correlation lengths. One such disadvantage is that the use of long correlation lengths masks dip patterns needed for stratigraphic analysis, thus additional computatons must be made using a shorter length to obtain stratigraphic information. Another disadvantage is that most techniques employing long correlation lengths are influenced by frequently occurring stratigraphic features having a common dip and direction, even though each such feature is less pronounced than the structural feature. Thus, the use of long correlation lengths does not assure that accurate structural dip information has been obtained. Yet another disadvantage is that current correlation techniques tend to ignore the possibly objectionable effects of rotation of the dipmeter tool within the long correlation interval. While it would be more desirable to obtain the detailed information availiable only from short correlation intervals and then apply previously mentioned trend analysis to separate the stratigraphic and structural dips, it will be appreciated that as the correlation interval is shortened, the probability of obtaining a completely erroneous displacement increases substantially. The wrong peak on the correlation function produced in the correlation process may be used to determine the displacement. Such invalid displacements may be combined with valid displacements to produce erroneous dip information which add scatter and confuse valid trends or, when the invalid displacements are systematically erroneous, may even appear as false trends. As a compromise, it has been the practice to employ correlation intervals having a length which is greater than the length actually desired so as to reduce this scatter to an acceptable level such that any valid trend which may be present might be found. As a result, the occurrence of dip estimates has no relationship to the occurrence of bed boundaries, deposition boundaries between regions of different geological activity or the degree of geological activity.

SUMMARY OF THE INVENTION

In accordance with principles of the present invention shortcomings of aforementioned prior art methods of dipmeter signal processing, involving the computation of sets of displacements followed by the fitting of dip planes to these displacements, are overcome by optimizing a single criterion in going from resistivity signals to dip estimate. Advantageously, this optimization may involve maximizing a weighted sum of cross-correlation functions between the different pairs of resistivity signals. Through the employment of such single criterion the limitation inherent in the prior art processing, due to the dependency of the dip determination on the selection process of significant displacements from the resistivity curves which selection process by necessity ignores other possible displacements, is overcome since all possible displacements between resistivity curves are considered in the determination of dip planes. Additionally, the different weighting of the cross-correlation functions in the proposed signal processing scheme provides an assurance that the resulting dip estimate is derived with due consideration of the relative merit of factors such as the quality of measured resistivity signals and the presence of isolated dominant features in the resistivity curves. Therefore, by taking account of the totality of information provided by the resistivity curves and by the further consideration of the relative merit of such information, more accurate and geologically consistent dip and azimuth values for subsurface formations may be determined.

In further accordance with principles of the present invention the cross-correlation functions, derived from respective pairs of resistivity signals, are determined for a selected first depth level from the cross-correlation of a sample (i.e., a one foot interval) of one of the curves with respect to a larger interval comprising several samples of the other curve which encompass the selected depth level. A second sample adjacent to the first sample is then selected and values for the cross-correlation function are again determined. This process is repeated for any interval of depth and the normalized values of the cross-correlation functions are displayed as a function of depth. This display, for dip analysis purposes, affords considerable insight into the nature of the information provided by pairs of resistivity curves and aids in the interpretation of dip planes since trends and discontinuities in the cross-correlation functions, as a function of depth, between pairs of curves are rendered clearly visible. Additionally, the degree and sharpness of cross-correlation over different portions of the curves are also rendered clearly visible and may therefore be employed to provide a measure of the quality of the resistivity curves obtained from the dipmeter tool and therefore affords the opportunity of adaptively adjusting the respective weights given to each cross-correlation function in the process of fitting a dip plane.

Yet in further accordance with principles of the present invention, the display of the cross-correlation functions as a function of depth affords the further opportunity of avoiding the use of fairly long correlation lengths, dictated by the need in the prior art practices to resolve ambiguities in displacements, in favor of shorter correlation lengths since the ambiguities in displacements can be resolved by detecting the aforementioned discontinuities in the cross-correlation functions between pairs of resistivity curves. Therefore, according to the novel practices of the present invention, both the resolution afforded by short correlation lengths, which preserve rapid changes in the curves, and the smoothing required to resolve ambiguities can be attained.

Yet in further accordance with principles of the present invention, the display of the cross-correlation functions as a function of depth affords the added opportunity of zoning the data along the depth dimension. This zoning of the data provides for a greater accuracy and efficiency in the processing of the dipmeter data since dip estimates are not produced at fixed intervals of depth but are rather produced in intervals of depth which are chosen from segments of data where the undesirable effects of discontinuities in the cross-correlation functions between pairs of curves are greatly reduced. Therefore a positive relationship is established between dip estimates and the occurence of bed boundaries, deposition boundaries or degree of geological activity.

In accordance with one embodiment of the present invention, methods and apparatus, for processing signals derived along portions of the length of a borehole to determine the relative position of geological function characteristics, effect the correlation of pairs of signals using substantially overlapping correlation intervals to obtain cross-correlation functions for each pair of signals. These cross-correlation functions are then side-by-side displayed as a function of borehole depth for each pair of curves such that discontinuities in the cross-correlation functions are rendered obvious. From such discontinuities, zoning of the data is enabled through determination of the position of significant continuous intervals. Sequences of cross-correlation functions which belong to one of these intervals are then used to directly determine, through the employment, for example, of a function maximizing criterion, dip and azimuth values for subsurface formations.

BRIEF DESCRIPTION OF THE DRAWINGS

In the Drawings:

FIGS. 5a, 5b and 5c are respective displays of a number of correlation functions for respective pairs of resistivity signals provided by the apparatus of FIG. 1, displayed as function of borehole depth.

DETAILED DESCRIPTION OF THE INVENTION

Figures 1, 2:
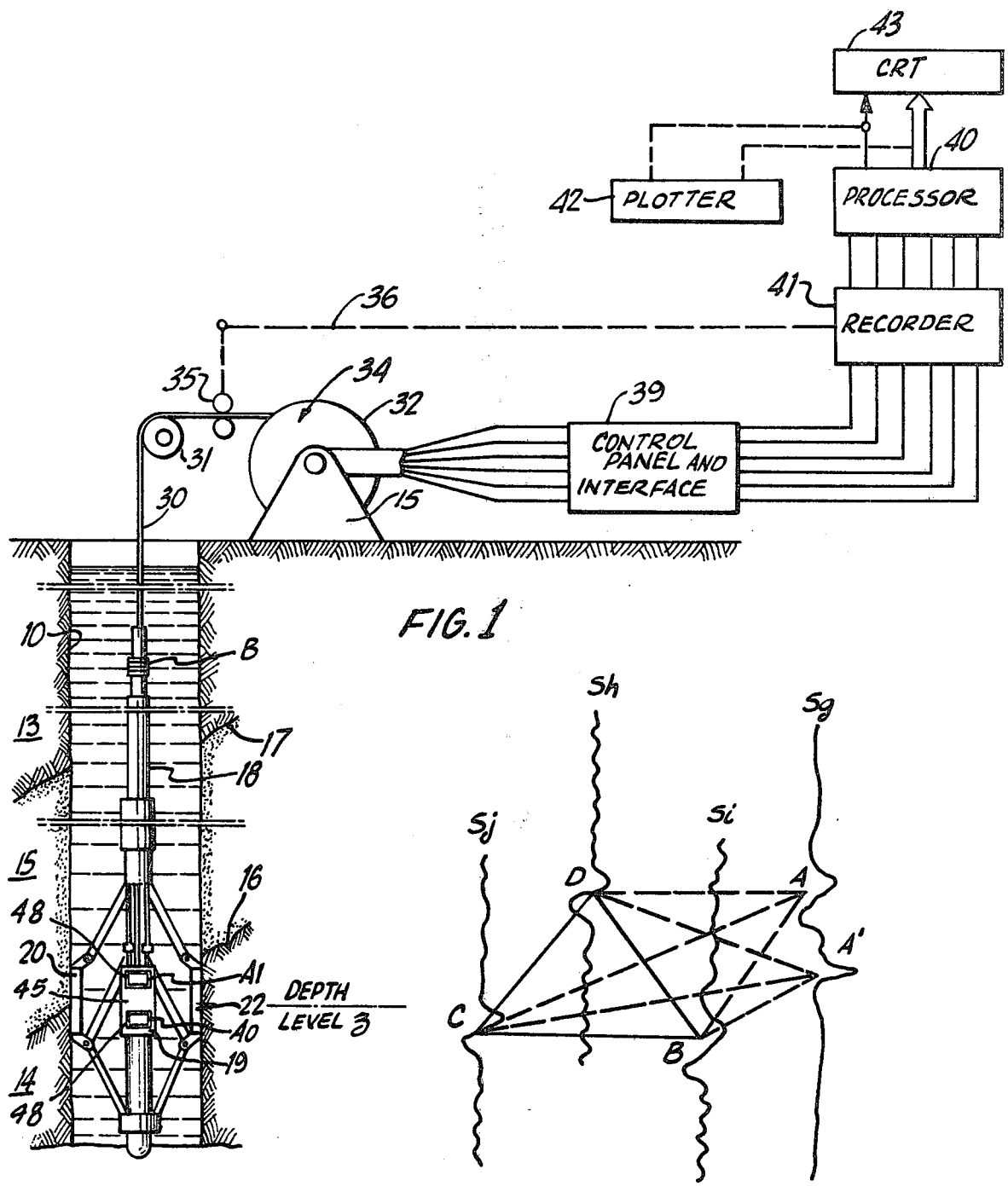
FIG. 1 is a view of an investigating device in a borehole along with apparatus at the surface of the earth for controlling the investigating apparatus and recording the measurements derived therefrom in accordance with an embodiment of the present invention.
FIG. 2 is an example of logs produced from laterally spaced apart sensors of the device of FIG. 1, when the device passes through a borehole.

Referring now to FIG. 1, there is illustrated a method of acquiring and processing signals obtained from a borehole investigating device commonly known as a dipmeter. This device is described in one form in U.S. Pat. No. 3,521,154 issued July 21, 1970 to J. J. Maricelli. The purpose of the dipmeter device is to obtain signals from three or more radially spaced sources usually supported on pads which contact the borehole wall. Signals obtained from such sources reflect formation features at their intersection with the borehole wall and are useful in determining the orientation of the formations penetrated by the borehole.

Typical earth formations are represented by the shale formations 13 and 14 shown in FIG. 1, and intervening sand formation 15. Typical formation features are boundaries 16 and 17 shown between these formations.

As shown in FIG. 1, the borehole apparatus 18 is lowered on a cable 38 into a borehole 10 for investigating the earth's formations. The downhole investigating device 18 is adapted for movement through the borehole 18 and as illustrated, includes four pads designated 19, 20, 21 and 22 (the front pad 19 obscures the view of back pad member 21 which is not shown).

The pad members 19 through 22 are adapted to derive measurements at the wall of the borehole. Each pad includes a survey electrode shown as Ao. One of the pads, herein designated as pad 19, may contain an additional survey electrode A1 useful in determining the speed of the tool. Each survey electrode is surrounded by an insulating material 48. The insulating material in turn is surrounded by a main metal portion 45 of the pad. The metal portion 45 of each pad, along with certain other parts of the apparatus, comprise a focussing system for confining a survey current emitted from each of the different survey electrodes into a desired focussed pattern. Survey signals representative of changes in the formation opposite each pad are obtained from circuits comprising Ao electrodes, focussing elements, and a current return electrode B.

The upper end of the borehole tool 18 is connected by means of the armored multiconductor cable 30 to a suitable apparatus at the surface for raising and lowering the downhole investigating device through the borehole 10. Mechanical and electrical control of the downhole device may be accomplished with the multiconductor cable which passes from the downhole tool 18 through the borehole to a sheave wheel 31 at the surface and then to a suitable drum and winch mechanism 32.

Electrical connections between various conductors of the multiconductor cable, which are connected downhole to the previously described electrodes, and various electrical circuits at the surface of the earth are accomplished by means of a suitable multi-element slip-ring and brush contact assembly 34. In this manner, the signals which originate from the downhole investigating device are supplied to a control panel 39 which in turn supplies signals to a processor 40 and a recorder 41. A suitable signal generator (not shown) supplies current to the downhole tool and to signal processing circuits located at the surface. More details of such circuits are described in the aforementioned Maricelli patent.

Signals obtained from the downhole device may be recorded graphically by a plotter 42 and displayed on a CRT 43. In addition, the signals may be processed to obtain discrete samples which may then be recorded on digital tape. A suitable digital tape recorder is described in U.S. Pat. No. 3,648,278 issued to G. K. Miller, et al on Mar. 7, 1972.

The signals may be sampled by driving sampling devices, such as those described in the above-mentioned Miller, et al patent, by the cable motion as measured at the surface. For example, the cable length measuring wheel 35 may be used in controlling the signal processing, sampling and recording functions as indicated by signal line 36. Therefore, each sample of a measured signal corresponds to one increment in depth and displacements determined between such sample signals are indicative of depth displacements.

The dipmeter signals or samples thereof may also be transmitted directly to a computer. Such a computer may be located at the well site. Alternatively, the signals may be transmitted via a transmission system to a computer at a remote location. One transmission system which may be used is described in U.S. Pat. No. 3,599,156 issued to G. K. Miller, et al. on Aug. 10, 1971.

The recorded or transmitted signals may be processed as digital measurements by general purpose digital computing apparatus properly programmed in a manner to perform the processes described herein or by special purpose computing apparatus composed of modules arranged to accomplish the described steps to accomplish the same process.

Alternatively, the signals may be processed directly at the well site, using conventional digital computing apparatus forming part of the processor 40 when properly programmed and interfaced to signal conversion means (not shown). One such computing apparatus is the Model PDP-11/45 obtainable from the Digital Equipment Corporation. Suppliers of such equipment may also supply signal conditioning circuits and signal conversion means suitable for conditioning and converting analog signals to digital samples for subsequent digital storage and processing. Further, such computing apparatus ordinarily include a memory for storing data and information such as parameters, coefficients and controls used and generated by the processing steps.

Referring now to FIG. 2, there is shown four signals which may be obtained from the sensors of the four-pad tool of FIG. 1. The signals, designated Si, Sj, Sg and Sh where i, j, g and h refer to respective sensors of the four pad tool of FIG. 1, provide indications of a formation characteristic such as resistivity and each indication contains common features designated B, C and D on each of the Si, Sj and Sh signals respectively. The signal Sg contains not only this feature, here designated as A, but an additional feature designated as A'. Thus, as illustrated, there is a question as to whether the Feature A or A' corresponds to the unique features B through D on the other signals. As illustrated unique features B, C and D accurately and unambiguously define a plane B-C-D. However, when feature A is taken in combination with B and D, plane A-B-D is defined while with feature A', a different plane, A'-B-D is defined. Still further, when the features on Sg are taken in conjunction with B and C, two additional planes, A-B-C and A'-B-C are defined and similarly in conjunction with C and D, planes A-C-D and A'-C-D are defined and more than one choice for a dip plane which fits the derived signals exists.

The prior art practice of deriving displacements between the features and then discarding all but a minimum of two related displacements between three features to estimate a dip plane is of course heavily dependent upon the ability to consistently pick the best two displacements, which usually are taken as those which correlate the "best" the one with the other. There are also other prior art methods of qualifying these "best" displacements which methods take into account other than "best" displacements as described for example in copending U.S. Application Ser. No. 537,998, filed on Dec. 30, 1974 for Clavier, et al. and assigned in common with the present application to the Schlumberger Technology Corporation. It will be appreciated of course that in accordance with the present invention, as described hereinafter, estimates of dip planes may be derived without recourse to the derivation of displacements between common features of respective signals from a dip-meter tool and thereby the pitfall of making a wrong choice of displacement in estimating dip is avoided.

Figure 3:
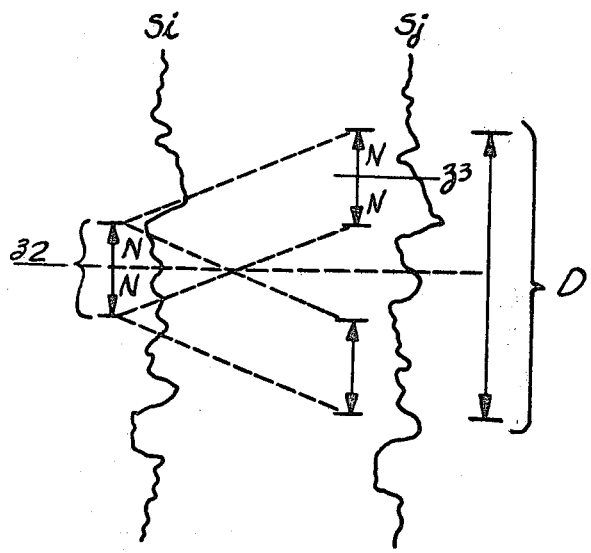
FIG. 3 represents the relationship between the sampling intervals of respective curves employed in the derivation of cross-correlation functions in accordance with the present invention.

Turning now to FIG. 3, there is shown two of the signals, e.g., Si and Sj, which are to be cross-correlated in accordance with practices of the present invention. The presently considered respective depth levels, shown on signals Si and Sj in FIG. 3, are designated z2 and z3. The depth levels z2 and z3, respectively for signals Si and Sj, are depth levels given by the surface depth registering apparatus and are the depth levels about which corresponding correlation intervals are centered. The depth interval over which data is used to produce the correlation function Cij (to be defined below) is designated as the correlation interval, 2N where N is, for purposes of illustration only, on the order of ½ a foot. The depth interval along which signal Sj is sampled in the correlation process is designated as the sampling interval D, where D is greater than 2N, as shown in FIG. 3. In practice, the choice of the length of the sampling interval D is dictated by the maximum amount by which features on signal Sj are assumed to be displaced relative to features on signal Si for any given depth level zi. As shown in FIG. 3, this choice of length for the sampling interval D can be determined from the diameter of the borehole when a maximum dip angle is assumed, e.g., a sampling interval of 3 feet is satisfactory assuming a borehole diameter of 10 inches and a maximum dip angle of 60 degrees. This sampling interval is furthermore divided uniformly into smaller intervals called search steps to be described below. After the signals Si and Sj have been correlated at the depth level z2, the same process is repeated at a new depth level which is an interval of a length 2N or less, called the correlation step, from the presently considered level z2.

As a first step in the correlation process, the correlation interval from one signal curve (in this case signal Sj) is effectively depth shifted one search step at a time along the sampling interval D relative to the correlation interval of the other curve (signal Si). A correlation factor between the correlation intervals is computed at each search step to produce a correlation function, Cij (zi, zj) for a given depth level z2. The search step is for simplicity herein considered to be one half the correlation interval 2N, but in practice could assume any lesser value such as the length of the interval which defines the resolution of the data acquisition process which forms signals Si and Sj. The correlation factor Cij (zi, zj) is for purposes of illustration computed using a normalized root mean square equation. Equations of this type are discussed in "Introduction to Probability in Statistics", by Henry L. Alder and Edward B. Roessler, published in 1964 by W. H. Freeman and Co., of San Francisco, Calif. One form of the equation to derive the normalized cross-correlation function is:

$$Cij(zi, zj) = \frac{\sum_{k=-N}^{N} \hat{S}i(zi + k) \hat{S}j(zj + k)}{\left[\sum_{k=-N}^{N} \hat{S}i(zi + k)^2\right]^{\frac{1}{2}} \left[\sum_{k=-N}^{N} \hat{S}j(zj + k)^2\right]^{\frac{1}{2}}} \quad (1)$$

where $\hat{S}i(k) = Si(k) - \frac{1}{2N+1} \sum_{l=-N}^{N} Si(zi + 1);$ and $\hat{S}j(k)$ has the same form as $\hat{S}i(k)$.

It will be appreciated that a yet more efficient, and well known, method to derive the cross-correlation function is through the employment of Fourier Transforms. Reference is hereby made to an article entitled "High-Speed Convolution And correlation" by Thomas G. Stockham, Jr. and published in the 1966 spring joint computer conf., AFIPS Conf. Proc., Vol. 28, pp 229-233, for a discussion of such a technique.

Figure 4:
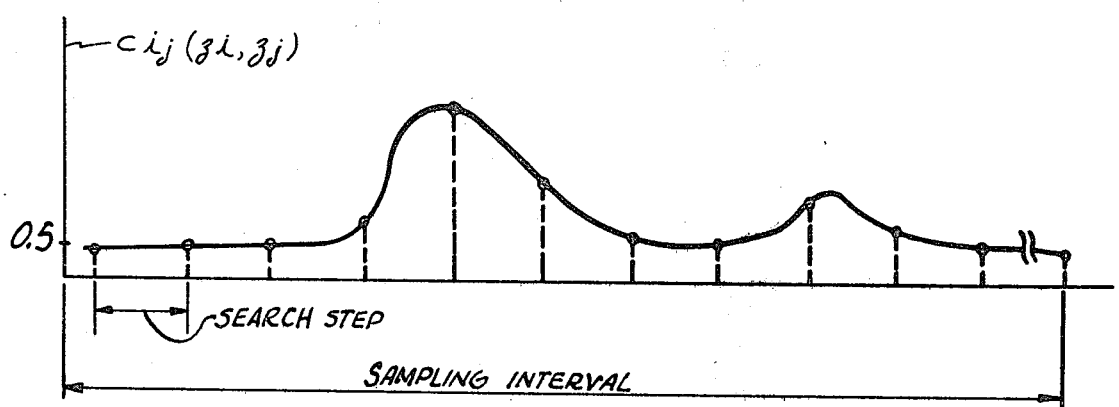
FIG. 4 is a graphical representation of a cross-correlation function, or correlogram, for one depth level.

Referring to FIG. 4, there is shown a graphical representation of cross-correlation function, Cij (zi, zj), herein also referred to as the correlogram which is clipped below a given level. e.g., 0.5 for clarity. Values assigned for the search steps are plotted along the abscissa and the clipped values of Cij (zi, zj) computed from equation (1) for each search step are plotted along the ordinate. Each Cij (zi, zj) value is represented as a point on the correlogram curve corresponding to a particular search step.

In accordance with the principles of the present invention, it has been found that graphic representations of normalized cross-correlation functions determined for substantially overlapping cross-correlation intervals are useful in the determination of dip planes. In addition, the analysis of changes in cross-correlation functions at various depth intervals and the evaluation of undesirable effects are facilitated. Overlapping cross-correlation intervals occur when the correlation step is less that the correlation interval. For substantial overlapping the correlation step should not exceed about 20% of the correlation interval.

FIGS. 5a, 5b and 5c, respectively show a plurality of clipped, normalized cross-correlation functions taken at substantially overlapping cross-correlation intervals for respective pairs of dipmeter signals of the type shown in FIG. 2. As shown by way of example in FIG. 5a, each curve, $C_{ij}(z_i, z_j)$, is a correlogram computed at adjacent, relatively closely spaced depth intervals from signals $S_i$ and $S_j$. To produce the display, a correlogram of a particular depth level is computed after which the depth is incremented and the correlogram computed for the adjacent depth level. This process continues until a correlogram for all depth levels of interest is computed. Then, when the correlograms for successive depth levels are displayed on a standard plotter or CRT display as shown, the sense of continuity necessary to follow a given feature in the correlogram becomes apparent. In this way the correlograms can be more accurately analyzed and the desirable and undesirable features taken into account.

To illustrate this, refer to the correlogram displayed in FIG. 5a, for depth level 2940. There is shown a single peak denoted as A. This is the usually expected correlogram and presents no problem, in the prior art practices, in determining the corresponding depth displacement between similar features of signals $S_i$ and $S_j$. However, the cross-correlation function sometimes contains two peaks of nearly equal value, such as is represented by A and B respectively for the correlogram at the next succeeding depth level 2920.

It has been observed that the presence of two or more peaks in normalized cross-correlation functions is associated with some features of logs which do not have exact similarity, particularly when the features result in a change in the mean value of the signal under correlation with the base signal. The values for elements of the cross-correlation function corresponding to depth displacements, where the signal feature is included in the ends of the correlation interval for signal $S_j$, for example, but is not included in the correlation interval for signal $S_i$, are adversely affected and sometimes create additional indications of similarity between the two signals. These additional indications or peaks persist despite the use of normalized equations for cross-correlation factors as discussed earlier.

When two peaks having approximately equal magnitude are present in a cross-correlation function, it is obvious that there may arise some difficulty in determining the correct displacement for such a correlation function.

By using and displaying substantially overlapping cross-correlation functions such as shown in FIG. 5a, it has been found that such additional indications of similarity usually appear at positions in the sampling interval corresponding to slightly different depth displacements for each overlapping cross-correlation function while the correct indication of similarity appears at about the same position in the sampling interval in each cross-correlation function. Thus as shown in FIG. 5a, the position of peaks B shifts systematically as the depth level of investigation changes and then disappears while the position of peaks A remains nearly constant with each successive correlogram. Thus, from this display it is clear that a correct feature correspondance is indicated by peaks A while feature correspondance indicated by peaks B can be safely disregarded and that the cross-correlation functions when displayed emphasize consistent relative depth displacements between common features of the respective signals. Large isolated peaks, in the correlogram, caused for example by noise, are easily seen on the correlogram display and disregarded.

In accordance with the principles of the present invention, a significant advantage of the presentation of the clipped, normalized values of the cross-correlation functions from several respective pairs of signals when displayed as described above as a function of depth, is realized when single record side-by-side displays for the same depth interval are examined. For example, FIGS. 5a, 5b, and 5c which illustrate a single record of respective displays of a number of cross-correlation functions for respective pairs of resistivity signals provided by the apparatus of FIG. 1, for the same depth interval of investigation, affords means for effecting zoning of the data. For example, in examining FIG. 5a, by itself, one might conclude that three continuous intervals labeled E, F and K exist for the depth interval displayed. However, an examination of FIG. 5b, providing cross-correlation functions for signals $S_j$ and $S_h$, makes it obvious that interval E is not one continuous interval as indicated from FIG. 5a, but is rather comprised of several intervals labeled G, I and J. This conclusion is also reinforced from an examination of FIG. 5c, providing a display of cross-correlation functions for signals $S_g$ and $S_h$. It is therefore obvious that the examination of any one set of cross-correlation functions for a depth interval is not sufficient to conclusively indicate the existence of continuous intervals and is not conclusively instrumental in the zoning of the data. One however, can safely conclude that, for example, interval K is a continuous zone since the emphasis of consistent relative depth displacements between common features of the respective signals repeats in all of the side-by-side displays. Likewise portions or subzones of zone E are continuous from display to display and indicate zones of continuity. Such subzones are labeled zones G and I on the Figures.

It will therefore be appreciated that the display of the cross-correlation functions as a function of depth and the respective single record display of side-by-side cross-correlation functions of respective pairs of resistivity curves from the same tool for a given depth interval affords the added opportunity of zoning the data along the depth dimension. This zoning of the data provides for a greater accuracy and efficiency in the processing of the dipmeter data since dip estimates are not produced at fixed intervals of depth but rather produced at intervals of depth which are chosen from segments of data where a positive relationship exists between the dip generated estimates and the occurrence of bed boundaries, deposition boundaries and the degree of geological activity.

After zoning of the data is accomplished, the dip planes may be determined for sections of the data at the beginning and at the end of each of the determined continuous zones where a smooth continuity is indicated. For example, such a zone is defined in interval K where the shift in the position of the peaks is rather minor. Dip estimates throughout other intermediate parts of zone K can be estimated by extrapolation from the dip values obtained for the beginning and the end parts of the zone. In contrast zone G, from an observation of the single record side-by-side cross-correlation functions, exhibits a marked shift in the position of the peaks especially as indicated in FIGS. 5b and 5c. Therefore, for zone G, one would desireably derive three estimates for dip planes one at the beginning part of the zone and one at the end part of the zone as is outlined above and yet a third dip estimate at the point where the greatest shift between the peaks occur. This point is indicated at G'. Other estimates can also be obtained for other portions of the zone.

Having defined the shortest continuous zones within the data intervals of interest, one, in accordance with principles of the present invention, would then derive an estimate of a dip plane by firstly making certain basic assumptions. The first of these assumptions, consistent with the assumptions made in the choice of the sampling interval, is that the maximum dip of any plane that is measured is 60 degrees. This is a realistic estimate and one that is useful to make since it provides some limitation as to the amount of data to be considered when estimating dip planes. It will be appreciated of course that other maximum dip estimates can be assumed, especially when other data exists which would lead one to assume lower values than 60 degrees.

Therefore, from a knowledge of the borehole diameter at the depth of interest one can estimate a search interval in which this maximum dip plane (at 60 degrees) would occur. For example, one may assume that this interval is equivalent to 36 inches for a borehole having a diameter of 10 inches. Of course the dimensions of this interval are not critical and one need provide only for the maximum dip occurrence. Having determined the search interval a search may then be conducted over such an interval at the beginning and at the end parts of the zone.

It is in further accordance with the principles of the present invention that the determination of the dip planes that are to be estimated at the aforesaid beginning and end parts of a zone is achieved by optimizing a single criterion in going from raw measured data (e.g., resistivity curves) to dip estimate. This method advantageously employs the cross-correlation functions, which were previously computed for the display purposes, in defining the dip plane in terms of a weighted sum of the cross-correlations as follows:

$$F(\Phi, \theta, z) = \sum_{i<j} W_{ij} C_{ij} [z_i + \Delta z_i(\Phi, \theta), z_j + \Delta z_j(\Phi, \theta)] \quad (2)$$

where $\Phi, \theta, z$ are the magnitude, azimuth and depth respectively of a dip plane, $\Delta z_i (\Phi, \theta)$ and $\Delta z_j (\Phi, \theta)$ are displacement functions determined by the geometric location of the respective ith and jth sensor on the dipmeter tool relative to an assumed dip plane, $C_{ij} [z_i + \Delta z_i (\Phi, \theta), z_j + \Delta z_j (\Phi, \theta)]$ is the windowed and normalized cross-corelation function between the signals from sensors i and j, and $W_{ij}$ is a weighting factor.

It will be appreciated that the function $F(\Phi, \theta, z)$ determines the fitting a dip plane to the resistivity curve data through a process in which this function is maximized. Maximization of this function is essentially equivalent to the minimization of mean square error or maximization of stacked energy. Therefore, the values for $\Phi, \theta$ and z which maximize the function correspond to the magnitude, azimuth and depth of a plane which best fits the data and is taken as an estimate of the dip plane. This process is repeated for another interval at the end part of the zone and yet another estimate of a dip plane is obtained.

Yet another advantage of the display of the single record side-by-side cross-correlation functions, as a function of depth for the same interval of interest, is the ability to discriminate between reliable data and unreliable data (e.g., caused by poor contact between one of the sensors and the formations). The weighting scheme presently contemplated provides either of a one or a zero value for the $W_{ij}$ term in equation (2). Other more sophisticated weighting schemes can be developed and are clearly within the contemplation of the present invention. For example, other values than one or zero may be employed such as one-half or another fraction of one depending on the amount of data determination.

One process for estimating a dip plane in accordance with the principles of the present invention can be simply implemented on a digital computer as follows:

One would initially set a desired z depth chosen, for example, from the end part of a continuous zone of interest. One would then set a constant equal to zero and provide for initial and final values for each of the $\Phi, \theta$. One can then further specify increments of change for both $\Phi$ and $\theta$ in moving from the initial values to the final values. Having derived or assumed values for $\Phi$ and $\theta$ one can compute $\Delta z_i (\Phi, \theta)$ for each sensor and the function $F(\Phi, \theta, z)$ (equation (2)) can then be computed. The constant is then compared to the function and should the function be lesser than the constant the process is repeated and both $\Phi$ and $\theta$ incremented, the new $\Delta z_i (\Phi, \theta)$ computed and the function $F(\Phi, \theta, z)$ computed. If during one of these computations the function is greater than the constant the constant is set equal to the function and the value of $\Phi, \theta$ recorded. This process is then continued until a maximum function is computed and the corresponding $\Phi, \theta$ and z then define the dip plane at z.

Figure 6:
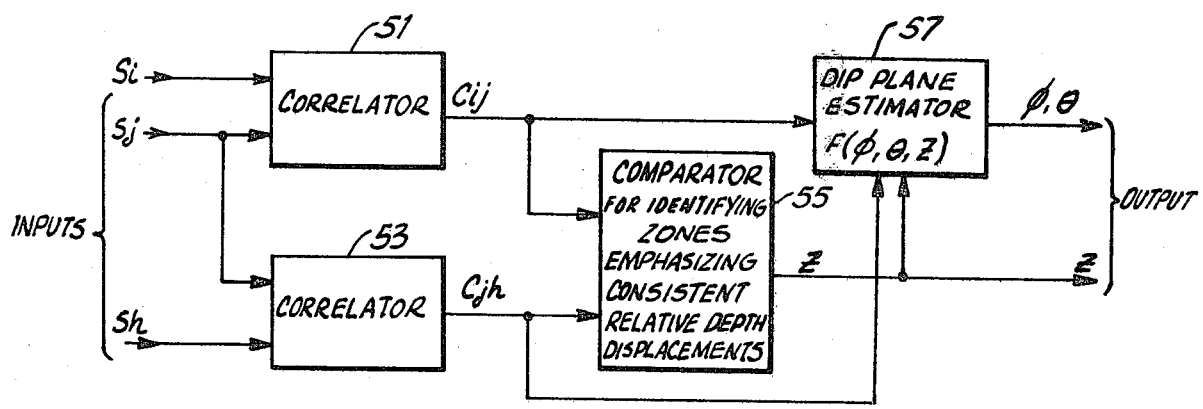
FIG. 6 is a block diagram of steps useful in the practice of the present invention in accordance with one embodiment thereof.

FIG. 6, represents, in block diagram form, components of an apparatus or steps of a method useful in the practice of the present invention in accordance with one embodiment thereof. This method or apparatus, for determining the relative position of formation features or dip planes along a borehole, contemplates processing three signals represented here by Si, Sj and Sh, representative of a characteristic of the formation along radially different positions of the borehole. The method of FIG. 6, comprises the steps of for each of two respective pairs of signals; at each given one of a succession of adjacent depth levels, finding a cross-correlation function, through operation of correlators 51 and 53, between respective correlation intervals of the signals when the correlation intervals are depth displaced relative to each other at selected steps. The method further comprises the step of identifying, in comparator 55, from a comparison of the cross-correlation functions for each of the successive depth levels for the two respective pairs of signals intervals of depth where the cross-correlation functions emphasize consistant relative depth displacements between common features of the respective signals. The output of comparator 55 will therefore comprise values of z where such zones begin and end. The method further includes the step of deriving, from the cross-correlation functions which are within the identified intervals of depth, an estimate of the relative position of the features. This takes place in a dip plane estimator 57 which in effect, through the fitting or function maximizing technique described above, provides estimates of Φ and θ corresponding to selected ones of the z outputs of comparator 55.

While the four pad dipmeter tool, shown in FIG. 1, has been used as an example to illustrate the techniques of the present invention, it should be understood that any multiple pad tool may be used. Further, these techniques may be practiced using sources for signals other than dipmeter pads or electrodes. For example, multi-element acoustic transmitter or receiver systems which are separately spaced at known positions may be used as the signals sources.

Moreover, while the present invention was described, for purposes of illustration, with reference to the provision of displays to effect zoning of the data, it will be appreciated that other methods of zoning not requiring physical displays are equally applicable and fall within the preview of the present invention.

What is claimed is:

1. A method for determining the relative position of formation features along a borehole by processing three signals representative of a characteristic of said formation along said borehole and derived at spaced apart locations around said borehole; comprising the steps of:
    (a) for each of two respective pairs of signals and at each given depth level in a succession of adjacent depth levels, finding a cross-correlation function between respective correlation intervals of the signals of said each pair of signals, when the correlation intervals are depth displaced relative to each other at selected steps;
    (b) identifying, from a comparison of the cross-correlation functions of said succession of adjacent depth levels for said two respective pairs of signals, intervals of depth for which respectively the associated cross-correlation functions emphasize, for said each pair of signals, a consistent relative depth displacement of the respective signals of said each pair of signals; and
    (c) deriving, from said cross-correlation functions which are within said identified intervals of depth, an estimate of the relative position of said formation features.

2. The method of claim 1 wherein said deriving step comprises the following steps:
    providing a function which defines the relative position of said features in terms of a weighted sum of said cross-correlation functions; and
    finding an amplitude and an azimuth value relative to the borehole relationship between said features which maximizes said provided function for a selected depth.

3. A method for determining the relative position of formation features along a borehole by processing three signals representative of a characteristic of said formation along said borehole and derived at spaced apart locations around said borehole; comprising the steps of:
    finding the degree of cross-correlation between the respective signals of each of two respective pairs of signals at a first selected depth level in the formation when respective portions of the signals of said each pair of signals are depth displaced relative to each other over a respective first depth interval at selected steps;
    finding the degree of cross-correlation between the respective signals of said each pair of signals at a second selected depth level, adjacent to said first depth level, when respective portions of of the signals of said each pair of signals are depth displaced relative to each other over a respective second depth interval at selected steps;
    producing respectively first traces showing the degree of cross-correlation found at said first depth level and respective second traces showing the degree of cross-correlation found at said second depth level for said each pair of signals;
    respectively forming the first and second traces for said each pair of signals on a side-by-side single record display such that said record presents the respective first and second traces for said each pair of signals adjacent to each other and arranged in an order related to depth level;
    identifying, from a comparison of the first and second traces for said each pair of signals formed on said side-by-side single record display, an interval of depth for which the first and second traces for said each pair of signals emphasize, for said each pair of signals, a consistent relative depth displacement of the respective signals of said each pair of signals; and
    deriving, from the first and second traces for said each pair of signals which are within said identified interval of depth, an estimate of the relative position of said formation features.

4. The method of claim 2 in which the first depth interval and the second depth interval substantially overlap.

5. The method of claim 2 including selecting further successively adjacent depth levels for the respective pairs of signals, finding the respective degree of cross-correlation therebetween respectively at each respective one of said successive depth levels when respective portions of the signals are depth displaced relative to each other over respective depth intervals at selected steps, and producing for each respective pair of signals a respective one of said traces at further depth levels and forming the last recited traces for each respective pair of signals on said side-by-side display such that each record presents the respective last recited traces adjacent to each other and arranged in an order related to depth level.

6. A method for determining the relative position of formation features along a borehole by processing three signals representative of a characteristic of said formation along said borehole and derived at spaced apart locations around said borehole; comprising the steps of:
    at each given one of a succession of adjacent depth levels, finding the degree of cross-correlation between respective portions of the signals, which are over a respective depth interval above and below the given depth level, when the respective portions of the signals are depth displaced relative to each other at selected steps;
    for each given one of said successive depth levels, producing respective traces of the degree of cross-correlation found at said each given depth level; and forming the traces on a single record, successively adjacent to each other
    whereby each of said single records obtained for respective pairs of signals are presented in a side-by-side display such that the traces obtained for any given depth level are adjacent;
    identifying, from a comparison of the traces presented in said side-by-side display, intervals of depth of which the traces emphasize, for each of said respective pairs of signals, a consistent relative depth displacement of the respective signals of said each pair of signals; and deriving, from the traces which are within said identified intervals of depth, an estimate of the relative position of said formation features.

7. The method of claims 3 or 6 in which the respective depth intervals for the respective adjacent depth levels substantially overlap.

8. The method of claims 3 or 6 including normalizing the amplitude of each of said traces prior to forming the trace on the record.

9. The method of claims 3 or 6 in which the step of forming the traces on the single record includes forming the traces for each respective pair of signals in a two-dimensional coordinate system in which one axis is depth level, wherein the respective traces for a given depth level for the respective pair of signals are presented side-by-side.

10. The method of claims 3 or 6 in which each step of finding the degree of cross-correlation between the respective pair of signals at a given depth level includes combining the respective portions of the signals in accordance with a normal correlation function to find a normalized correlogram indicative of the respective degree of cross-correlation between the respective pairs of signals at the given depth level.

11. The method of claim 10 in which the step of combining log portions to find a normalized correlogram for a given depth level includes combining respective signals portions which extend a given distance up and down in depth level from said given depth level.

12. The method of claims 3 or 6 in which each step of forming a trace on a single record comprises forming a trace in which amplitude changes are represented by intensity or density modulation of an otherwise straight trace.

13. The method of claims 3 or 6 in which each step of forming a trace on a single record comprises forming a trace in which amplitude changes are indicated by excursions of the trace along the depth level axis direction.

14. A method for determining the magnitude, azimuth and depth of a dip plane which intersects a borehole from correlations between related pairs of signals obtained along portions of the length of and at spaced apart points around the borehole, comprising the steps of:

producing overlapping correlations of the respective signals of related pairs of signals, each of said overlapping correlations overlapping adjacent correlations on the same related pair of geophysical signals;

comparing successive overlapping correlations of a first pair of signals to determine a sequence that emphasizes consistent relative depth displacements between common features of said first pair;

comparing successive overlapping correlations of a second pair of signals to determine a sequence that emphasizes consistent relative depth displacements between common features of said second pair;

selecting as a zone of valid determinations an interval of depth where both said first and second pairs of signals exhibit said respective sequences; and deriving, from said overlapping correlations which are within said selected zones, an estimate of the magnitude, azimuth and depth of a dip plane.

15. The method of claim 14 wherein said deriving step comprises the following steps:

providing a function which defines the relative position of said features in terms of a weighted sum of said cross-correlation functions; and finding an amplitude and an azimuth value relative to the borehole relationship between said features which maximizes said function for a selected depth.

16. The method of claim 14 wherein each of said comparing steps includes the following step:

providing respective traces showing the degree of overlapping correlations found at successive depth levels, and forming the traces on a single record, successively adjacent to each other.

17. The method of claim 16 further comprising the step of: presenting each of said single records obtained for each respective pair of signals in a side-by-side display such that the traces obtained for any given depth level are adjacent.

18. Apparatus for determining the relative position of formation features along a borehole by processing three signals representative of a characteristic of said formation along said borehole and derived at spaced apart locations around said borehole; comprising:

for each of two respective pairs of signals and at each given depth level in a succession of adjacent depth levels, means for finding a cross-correlation function between respective correlation intervals of the signals of said each pair of signals when the correlation intervals are depth displaced relative to each other at selected steps;

means for identifying, from a comparison of the cross-correlation functions of said succession of adjacent depth levels for said two respective pairs of signals, intervals of depth for which respectively the associated cross-correlation functions emphasize, for said each pair of signals, a consistent relative depth displacement of the respective signals of said each pair of signals; and means for deriving, from said cross-correlation functions which are within said identified intervals of depth, an estimate of the relative position of said formation features.

19. Apparatus for determining the relative position of formation features along a borehole by processing three signals representative of a characteristic of said formation along said borehole and derived at spaced apart locations around said borehole; comprising:

means for finding the degree of cross-correlation between the respective signals of each of two respective pairs of signals at a first selected depth level in the formation when respective portions of the signals of said each pair of signals are depth displaced relative to each other over a respective first depth interval at selected steps;

means for finding the degree of cross-correlation between the respective signals of said each pair of signals at a second selected depth level, adjacent to said first depth level, when respective portions of of the signals of said each pair of signals are depth displaced relative to each other over a respective second depth interval at selected steps;

means for producing respectively first traces showing the degree of cross-correlation found at said first depth level and respective second traces showing the degree of cross-correlation found at said second depth level for said each pair of signals;

means for respectively forming the first and second traces for said each pair of signals on a side-by-side single record display such that said record presents the respective first and second traces for said each pair of signals adjacent to each other and arranged in an order related to depth level;

means for identifying, from a comparison of the first and second traces for said each pair of signals formed on said side-by-side single record display, an interval of depth for which the first and second traces for said each pair of signals emphasize, for said each pair of signals, a consistent relative depth displacement of the respective signals of said each pair of signals; and means for deriving, from the first and second traces for said each pair of signals which are within said identified interval of depth, an estimate of the relative position of said formation features.

20. Apparatus for determining the relative position of formation features along a borehole by processing three signals representative of a characteristic of said formation along said borehole and derived at spaced apart locations around said borehole; comprising:

at each given one of a succession of adjacent depth levels, means for finding the degree of cross-correlation between respective portions of the signals, which are over a respective depth interval above and below the given depth level, when the respective portions of the signals are depth displaced relative to each other at selected steps;

for each given one of said successive depth levels, means for producing respective traces of the degree of cross-correlation found at said each given depth level; and means for forming the traces on a single record, successively adjacent to each other whereby each of said single records obtained for respective pairs of signals are presented in a side-by-side display such that the traces obtained for any given depth level are adjacent;

means for identifying, from a comparison of the traces presented in said side-by-side display, intervals of depth for which the traces emphasize, for each of said respective pairs of signals, a consistent relative depth displacement of the respective signals of said each pair of signals; and means for deriving, from the traces which are within said identified intervals of depth, an estimate of the relative position of said formation features.

21. The apparatus of claims 19 or 20 further including means for normalizing the amplitude of each of said traces prior to forming the trace on said record.

22. The apparatus of claim 21 in which the normalizing means includes means combining respective signal portions which extend a given distance up and down in depth level from a given depth level.

23. The apparatus of claims 19 or 20 in which the single record forming means includes means for forming the traces for each respective pair of signals in a two-dimensional coordinate system in which one axis in depth level, wherein the respective traces for a given depth level for the respective pair of signals are presented side-by-side.

24. A well logging method for producing a single record containing side-by-side displays, each display being of respectively two or more adjacent traces showing the respective degrees of correlation, at two or more respective adjacent depth levels for the same depth interval in an earth formation, of respective pairs of a plurality of well logs taken at different positions around a borehole in the formation, each respective trace showing the degree of cross-correlation of the logs of each respective pair of logs at the respective depth level when respective portions of the logs are depth displaced relative to each other over the depth interval at selected steps, comprising the following steps:

deriving a first, second and third well logs taken at different positions around a borehole in the earth formation;

finding the degree of cross-correlation of the respective logs of each of two different pairs of the well logs at a first selected depth level in the formation when respective portions of the respective logs of the pairs of logs are depth displaced relative to each other over a respective first depth interval at selected steps;

finding the degree of cross-correlation of the respective logs of each of the respective pairs of logs at a second selected depth level, adjacent to the first selected depth level, when respective portions of the respective logs of the pairs of logs are depth displaced relative to each other over a respective second depth interval at selected steps;

producing respectively first traces showing the degree of cross-correlation found at the first depth level and respective second traces showing the degree of cross-correlation found at the second depth level for each of the respective pair of logs, and respectively forming the first and the second traces for each respective pair of logs on a side-by-side single record display such that said record presents the respective first and second traces for each pair of logs adjacent to each other and arranged in an order related to depth level with the respectively first and respectively second traces from each of said respective pair of logs arranged adjacent to each other.

25. The well logging method of claim 24 in which the first depth interval and the second depth interval substantially overlap.

26. The well logging method of claim 24 including selecting further successively adjacent depth levels for the respective pairs of logs, finding the respective degree of cross-correlation therebetween respectively at each respective one of said successive depth levels when respective portions of the logs are depth displaced relative to each other over respective depth intervals at selected steps, and producing for each respective pair of logs a respective one of said traces at further depth levels and forming the last recited traces for each respective pair of logs on said side-by-side single display such that each record presents the respective last recited traces adjacent to each other and arranged in an order related to depth level.

27. The well logging method of claim 26 in which the respective depth intervals for the respective adjacent depth levels substantially overlap.

28. The well logging method of claim 27 including normalizing the amplitude of each of said traces prior to forming the trace on the record.

29. The well logging method of claim 28 in which the step of forming the traces on the single record includes forming the traces for each respective pair of logs in a two-dimensional coordinate system in which one axis is depth level, wherein the respective traces for a given depth level for the respective pair of logs are presented side-by-side.

30. The well logging method of claim 29 in which each step of finding the degree of cross-correlation between the respective pair of logs at a given depth level includes combining the respective portions of the logs in accordance with a normal correlation function to find a normalized correlogram indicative of the respective degree of cross-correlation between the respective pairs of logs at the given depth level.

31. The well logging method of claim 30 in which the step of combining log portions to find a normalized correlogram for a given depth level includes combining respective log portions which extend a given distance up and down in depth level from said given depth level.

32. The well logging method of claim 31 in which each step of forming a trace on a single record comprises forming a trace in which amplitude changes are represented by intensity or density modulation of an otherwise straight trace.

33. The well logging method of claim 31 in which each step of forming a trace on a single record comprises forming a trace in which amplitude changes are indicated by excursions of the trace along the depth level axis direction.

34. A well logging method of producing a single record containing a multiplicity of successively adjacent traces showing the respective degrees of cross-correlation at respective successively adjacent depth levels in an earth formation of a plurality of well logs taken along different positions in a borehole in the formation, each given trace showing the degree of cross-correlation at a given depth level of portions of a respective pair of logs which are within a selected depth interval above and below the given depth level, comprising the following steps for each of two respective pairs of logs:
at each given one of a succession of adjacent depth levels, finding the degree of cross-correlation between respective portions of the logs, which are over a respective depth interval above and below the given depth level, when the respective log portions are depth displaced relative to each other at selected steps;
for each given one of said successive depth levels, producing respective traces of the degree of cross-correlation found at said each given depth level; and forming the traces on a single record, successively adjacent to each other; and
further comprising the steps of:
presenting each of said single records obtained for each respective pair of logs in a side-by-side display such that the traces obtained for any given depth level are adjacent.

35. The well logging method of claim 34 in which the finding step includes finding the mutual degree of cross-correlation at successive depth levels for respective successive depth intervals which overlap with each other.

36. The well logging method of claim 35 in which the step of forming the traces on a single record comprises forming the traces in an orthogonal coordinate system in which one axis is relative depth displacement between logs and the other is depth level in the earth formation, each trace extending generally along the depth displacement axis and the traces for adjacent depth levels being adjacent to but spaced from each other along the depth level axis.

37. The well logging method of claim 34 in which each finding step comprises combining the respective portions of the logs in accordance with a normalized correlation function in order to produce a correlogram for the respective depth level based on the respective depth interval and the selected steps.

38. The well logging method of claim 34 in which the step of forming the traces on a single record comprises representing amplitude changes in the trace by density modulation or intensity modulation of a trace which generally extends along a straight line.

39. The well logging method of claim 34 in which the step of forming the traces on a single record comprises forming each trace as a line which extends generally in one direction but is amplitude modulated to make excersions in an orthogonal direction.

* * * * *

UNITED STATES PATENT AND TRADEMARK OFFICE
CERTIFICATE OF CORRECTION

PATENT NO. : 4,355,357
DATED : October 19, 1982
INVENTOR(S) : David S.K. Chan

It is certified that error appears in the above-identified patent and that said Letters Patent is hereby corrected as shown below:

In the Specification, column 5, line 51, "38" should read --30--; line 54, "18" should read --10--. Column 11, line 57, "cross-corelation" should read --cross-correlation--.

In the Claims, column 13, line 67 (Claim 3), delete "of" (first occurrence); Column 14, line 67 (Claim 6), "of" should read --for--. Column 16, line 57 (Claim 19), delete "of". Column 17, line 56 (Claim 23), "in" (second occurrence) should read --is--.

Signed and Sealed this

Fifteenth Day of November 1983

[SEAL]

Attest:

GERALD J. MOSSINGHOFF

Attesting Officer   Commissioner of Patents and Trademarks